United States Patent [19]

Höhlein et al.

[11] Patent Number: 5,252,648
[45] Date of Patent: Oct. 12, 1993

[54] COMPOSITIONS CONTAINING OCTADIENYL ETHERS AS REACTIVE THINNERS

[75] Inventors: Peter Höhlein, Kempen; Jürgen Meixner, Krefeld; Josef Pedain, Cologne, all of Fed. Rep. of Germany

[73] Assignee: Bayer Aktiengesellschaft, Leverkusen, Fed. Rep. of Germany

[21] Appl. No.: 985,977

[22] Filed: Dec. 4, 1992

[30] Foreign Application Priority Data

Dec. 13, 1991 [DE] Fed. Rep. of Germany ....... 4141190

[51] Int. Cl.$^5$ ............................................. C08L 75/04
[52] U.S. Cl. ................................... 524/306; 524/308; 524/310; 524/311; 524/314; 524/315; 524/318; 524/366; 524/376; 524/377; 524/755; 524/757; 525/328.8; 525/330.3; 525/330.6; 525/383; 525/385; 525/437; 525/454
[58] Field of Search ............... 524/306, 308, 310, 311, 524/314, 315, 317, 318, 366, 376, 377, 378, 755, 757, 759, 760, 761, 762; 525/325.4, 328.8, 329.5, 330.3, 330.6, 383, 384, 385, 437, 453, 454, 472, 502, 523, 529

[56] References Cited

U.S. PATENT DOCUMENTS 3,819,720  6/1974  Kliegman .................. 260/615 A

OTHER PUBLICATIONS

Chemical Abstracts, vol. 86, No. 20, May 16, 1977, Abstract No. 141793.
Chemical Abstracts, vol. 79, No. 24, Dec. 17, 1973, Abstract No. 137968.
Chemical Abstracts, vol. 80, No. 20, May 20, 1974, Abstract No. 109251.
Chemical Abstracts, vol. 87, No. 13, Sep. 26, 1977, Abstract No. 97385.

Primary Examiner—Maurice J. Welsh
Attorney, Agent, or Firm—Joseph C. Gil; Thomas W. Roy

[57] ABSTRACT

The present invention relates to a composition which is suitable for the preparation of coatings, sealants and/or fillers and contains one or more binder components and as reactive thinner an octadienyl ether which may contain ester groups and which has a viscosity at 23° C. of at most 5,000 mPas and a content of 1 to 80% by weight of octadienyl groups, —$C_8H_{13}$, 0 to 35% by weight of hydroxyl groups and 0 to 30% by weight of carboxyl groups.

16 Claims, No Drawings

COMPOSITIONS CONTAINING OCTADIENYL ETHERS AS REACTIVE THINNERS

BACKGROUND OF THE INVENTION

1. Field of the Invention

The present invention relates to the use of low-viscosity octadienyl ethers optionally containing ester, carboxyl and/or hydroxyl groups as reactive thinners for coating compositions and also knifing fillers and sealing compositions.

2. Description of the Prior Art

For reasons of environmental hygiene, efforts are being made to minimize the content of organic solvents in coating compositions or to eliminate the need for inert solvents altogether.

One method of achieving this objective is to use reactive thinners, i.e., low viscosity liquids, which by virtue of their low viscosity enable processing viscosities to be established using minimal quantities of inert solvents and which participate in the crosslinking reaction through reactive centers so that they are incorporated in the resulting coating and do not escape into the environment.

It has now been found that low-viscosity octadienyl ethers optionally containing ester, carboxyl and/or hydroxyl groups of the type described in more detail hereinafter are versatile reactive thinners. Their versatility is attributable to the presence of different reactive groups which, depending upon the binder used, either facilitate a reaction with the binder or with one of the binder components during the chemical curing process or provide for a polymerization reaction which takes place at the same time as curing of the principal binder, so that homogeneous coatings essentially representing chemically crosslinked systems or polymer mixtures are formed.

SUMMARY OF THE INVENTION

The present invention relates to a composition which is suitable for the preparation of coatings, sealants and/or fillers and contains one or more binder components and as reactive thinner an octadienyl ether which may contain ester groups and which has a viscosity at 23° C. of at most 5,000 mPas and a content of 1 to 80% by weight of octadienyl groups, —$C_8H_{13}$, 0 to 35% by weight of hydroxyl groups and 0 to 30% by weight of carboxyl groups.

DETAILED DESCRIPTION OF THE INVENTION

The use of the fatty acid esters of octadienyl ethers of polyols in which at least one of the hydroxyl groups is etherified with an octadienyl group and in which the remaining free hydroxyl groups are esterified with unsaturated fatty acids containing 6 to 22 carbon atoms as reactive thinners in oxidatively drying lacquers is preferably excluded from the scope of the present invention.

The binders to which the octadienyl ethers crucial to the invention are added are either one-component binders which may be self-crosslinked by polymerization, polycondensation or polyaddition, or multicomponent, preferably two-component, systems crosslinkable by polymerization, polycondensation or polyaddition. Particularly suitable binders include radical-curable, olefinically unsaturated polyester resins which may contain urethane groups and which are suitable as binders for coating compositions, knifing fillers and sealing compositions, oxidatively drying binders, more particularly alkyd resins, which are used in particular for the production of coatings, two-component polyurethane binders based on hydroxy-functional polyester and/or polyacrylate resins in combination with known lacquer polyisocyanates which are used in particular for the production of high-quality two-component polyurethane coatings, known epoxy resins, more particularly amine-cured epoxy resins which are suitable both for the production of coating compositions and for the production of knifing fillers and sealing compositions, amino resins and phenolics which may be used either as self-crosslinking lacquer binders or as curing agents for other film-forming, more particularly hydroxy-functional or carboxy-functional, binder components in lacquers for various applications or silicone resins which may be cured by polycondensation to high-quality coatings.

The octadienyl ethers to be used in accordance with the invention are generally suitable as reactive thinners for any chemically curing binders or binder compositions, for example, those described by H. G. Elias in Makromoleküle, 3rd Edition (1975), pages 715 et seq., Hüthig und Wepf-Verlag, Basel/Heidelberg; in Houben-Weyl, Methoden der organischen Chemie, Makromolekulare Stoffe, Teilbände 2 und 3, pages 689–2237 (1987), 4th Edition, Georg Thieme Verlag Stuttgart-/New York; or by H. Wagner and H. F. Sarx in Lackkunstharze, Carl Hanser Verlag München (1971), 5th Edition.

The octadienyl ethers to be used according to the invention are liquids which are optionally ester-functional and which have a viscosity at 23° C. of 15 to 5,000, preferably 20 to 2,000 mPas; a content of octadienyl groups (empirical formula —$C_8H_{13}$) incorporated through ether groups of 1 to 80% by weight, preferably 5 to 78% by weight; a content of alcoholic hydroxyl groups of 0 to 35% by weight, preferably 0 to 28% by weight; and a content of carboxyl groups of 0 to 30% by weight, preferably 0 to 20% by weight.

The octadienyl groups are preferably structural units corresponding to the formula

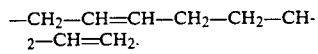

—$CH_2$—$CH$=$CH$—$CH_2$—$CH_2$—$CH_2$—$CH$=$CH_2$.

The octadienyl ethers to be used in accordance with the invention are telomerization products of butadiene with polyhydric alcohols or esterification products of such telomers.

The telomerization of butadiene with polyhydric alcohols is known and described, for example, in DE-OS 2,148,156, DE-OS 2,011,163, GB-PS 2,114,974, J. Chem. Soc. D (4), 193–4 (1971) or Izv. Nauk SSSR, Sev. Khim. (1981) (8), pages 1837 to 1942.

Suitable starter molecules for the telomerization include polyhydric alcohols having a molecular weight of 62 to 400, preferably 62 to 160 and more preferably 62 to 150. Examples of such alcohols include ethylene glycol, propylene glycol, glycerol, trimethylol propane, pentaerythritol, dipentaerythritol, mannitol, sorbitol, sucrose and mixtures of these and optionally other alcohols.

The telomerization is preferably carried out in the presence of palladium catalysts, such as palladium/- phosphine complexes, and generally in the presence of solvents, such as isopropanol. The degree of telomerization may be controlled by suitably selecting the quantities in which the reactants are used.

On average the preferred telomers obtained in this way contain at least one octadienyl group per molecule. Any octadienyl ethers of this type may be used as reactive thinners in accordance with the invention providing they satisfy the criteria mentioned above.

Particularly preferred reactive thinners for use in accordance with the invention are those obtained by the reaction of alcohols containing octadienyl ether groups obtained as previously described with monocarboxylic or polycarboxylic acids or with polycarboxylic anhydrides in an esterification reaction. Preferred telomers for these reactions are prepared from at least trihydric alcohols or mixtures of alcohols having a functionality of at least 3, and contain at least one free hydroxyl group per molecule. The telomerization products of glycerol and butadiene containing 5.5 to 17% by weight of hydroxyl groups and/or the telomerization products of trimethylol propane and butadiene containing 4.9 to 14.0% by weight of hydroxyl groups are particularly suitable for the esterification reaction.

Carboxylic acids suitable for the esterification reaction include saturated and/or olefinically unsaturated aliphatic monocarboxylic acids containing 2 to 22, preferably 6 to 20 carbon atoms; saturated and/or olefinically unsaturated cycloaliphatic monocarboxylic acids containing 6 to 15, preferably 7 to 10 carbon atoms; aromatic monocarboxylic acids containing 7 to 15, preferably 7 to 11 carbon atoms; saturated and/or olefinically unsaturated aliphatic polycarboxylic acids containing 4 to 12, preferably 4 to 8 carbon atoms; saturated and/or olefinically unsaturated cycloaliphatic polycarboxylic acids containing 6 to 15, preferably 8 carbon atoms; aromatic polycarboxylic acids corresponding to these cycloaliphatic polycarboxylic acids; and the anhydrides of the polycarboxylic acids which are capable of intramolecular anhydride formation.

Examples of monocarboxylic acids include acetic acid, propionic acid, butyric acid, valeric acid, caproic acid, caprylic acid, pelargonic acid, capric acid, lauric acid, myristic acid, palmitic acid, stearic acid, arachic acid, eicosane carboxylic acid, behenic acid, acrylic acid, crotonic acid, lauroleic acid, myristoleic acid, palmitoleic acid, oleic acid, gadoleic acid, erucic acid, ricinoleic acid, linoleic acid, arachidonic acid, clupanodonic acid, benzoic acid, hexahydrobenzoic acid, tetrahydrobenzoic acid, abietic acid, cinnamic acid and 1-naphthylic acid.

Examples of polycarboxylic acids include maleic acid, maleic anhydride, fumaric acid, succinic acid, oxalic acid, adipic acid, phthalic acid, phthalic anhydride, isophthalic acid, terephthalic acid, tetrahydrophthalic acid, tetrahydrophthalic anhydride, hexahydrophthalic acid, hexahydrophthalic anhydride, 1,4-cyclohexane dicarboxylic acid, glutaric acid, pimelic acid, suberic acid, azelaic acid, sebacic acid, nonanedicarboxylic acid, decanedicarboxylic acid, undecanedicarboxylic acid, norbornene dicarboxylic acid, malic acid, tartaric acid, trimellitic acid, trimellitic anhydride, pyromellitic acid, pyromellitic anhydride and/or mixtures thereof.

Fatty acids or fatty acid mixtures emanating from natural sources, which may be used in technically prepared and modified form, are particularly suitable and include castor oil fatty acid, coconut oil fatty acid, cottonseed oil fatty acid, rapeseed oil fatty acid, soybean oil fatty acid, tall oil fatty acid, tallow fatty acid, herring oil fatty acid and whale oil fatty acid. These acids may be used in the form of natural and/or synthetic mixtures or as esterification products with polyols.

The esterification reaction may be carried out in known manner, for example, by melt or azeotropic esterification of the alcohols and acids or esterifiable derivatives thereof, cf. "Methoden der organischen Chemie" (Houben-Weyl), 4th Edition, Vol. 14.2, Georg Thieme Verlag Stuttgart, 1962, pages 1-5, 21-33 and 40-44. The esterification is preferably carried out in an inert gas atmosphere at temperatures of 140° to 220° C.

When polycarboxylic acids or polycarboxylic anhydrides are used, ester-functional octadienyl ethers having a carboxyl group content within the limits mentioned above may be obtained in the esterification reaction. To carry out the esterification reaction, the alcohols containing octadienyl ether groups and the carboxylic acids or carboxylic anhydrides are generally used in such quantities that there are 1 to 9, preferably 1 to 5, moles of alcoholic hydroxyl groups per mole of carboxyl groups or per half mole of carboxylic anhydride groups.

In order to protect the optionally ester-functional octadienyl ethers to be used in accordance with the invention against unwanted premature crosslinking, it is advisable to add 0.001 to 0.1% by weight of polymerization inhibitors or antioxidants to the ethers during their actual production or, in the production of ester-functional octadienyl ethers, preferably during the esterification reaction. Suitable stabilizers are described in "Methoden der organischen Chemie" (Houben-Weyl), 4th Edition, Vol. 14/1, pages 443 et seq., Georg Thieme Verlag, Stuttgart, 1961. One example of a particularly suitable stabilizer is p-benzoquinone, which is used in a concentration of 0.01 to 0.05% by weight, based on the octadienyl ether to be used in accordance with the invention.

As reactive thinners, the octadienyl ethers to be used in accordance with the invention are a constituent of the particular binder used. They are generally used in quantities of 1 to less than 100% by weight, preferably 5 to 80% by weight, based on the total weight of all the binder components, including the reactive thinners.

The octadienyl ethers to be used in accordance with the invention are particularly suitable as reactive thinners for radical-curing binders, especially optionally urethane-modified unsaturated polyester resins, such as air-drying alkyd resins and/or unsaturated acrylate resins, which are generally cured by the addition of suitable photoinitiators under the effect of high-energy radiation (UV light, electron beams) or under the effect of atmospheric oxygen using siccatives (alkyd resins).

The synthesis principle, production and applications of unsaturated polyesters and unsaturated acrylate resins are described in detail in H. Wagner, H. F. Sarx "Lackkunstharze", 5th Edition, Carl Hanser Verlag, München (1971), pages 129 et seq.; Houben-Weyl "Methoden der organischen Chemie", Vol. 4, Georg Thieme Verlag, Stuttgart/New York (1987), Vol. 2, Makromolekulare Stoffe, pages 1405 et seq.; Ullmanns Enzyklopädie der technischen Chemie, Vol. 11 (1960), pages 345 et seq. and Vol. 14 (1963), pages 87 et seq.; S. E. Young in "Progress in Organic Coatings", 4 (1976), pages 225 et seq.; H. J. Rosenkranz in "Farbe und Lack" 18, (1975), pages 608 et seq.; W. Brushwell in "Farbe und Lack" 91, No. 9 (1985), pages 812 et seq.; C.

B. Rybuy et al. in "Journal of Paint Technology", 46, No. 596 (1974), pages 60 et seq.; and K. J. O'Hara in "A Review of the Chemistry and Formulation of Todays Radiation Curable Coatings and Inks" Beta-Gamma 1/91, pages 13 et seq., presented at the "Rad Tech. Europe Radiation Curing Seminar" in Barcelona (1990).

For UV-crosslinking, photoinitiators have to be added to the coating compositions. Suitable photoinitiators are known and described, for example, in Houben-Weyl, "Methoden der organischen Chemie", Vol. E 20, pages 80 et seq., Georg Thieme Verlag, Stuttgart, 1987.

Suitable photoinitiators include benzoin ethers such as benzoin isopropyl ether, benzil ketals such as benzil dimethyl ketal, and hydroxyalkyl phenones such as 2-hydroxy-2-methyl-1-phenyl-1-propan-1-one.

The photoinitiators are used in quantities of 0.1 to 10% by weight, preferably 0.1 to 5% by weight, based on the total weight of all the binder components. Depending on the purpose for which the products according to the invention are intended, the photoinitiators may be used either individually or, by virtue of frequent advantageous synergistic effects, in combination with one another.

The advantages of the reactive thinners in unsaturated polyester and unsaturated acrylate resin binders—regardless of the method of curing—lies in the replacement of toxicologically unsafe reactants, such as styrene and low molecular weight (meth)acrylic acid esters and (meth)acrylic acid ethers, and in the replacement of physiologically unsafe solvents in solvent-containing coating compositions, for example, those containing alkyd resins.

Two-component polyurethane lacquers in which the reactive thinners according to the invention may be used preferably include those based on hydroxyfunctional resins, more preferably hydroxy-functional polyester and/or polyacrylate resins and known lacquer polyisocyanates. Whereas, the octadienyl ethers to be used in accordance with the invention are incorporated in systems based on olefinically unsaturated polyesters and polyacrylates by a copolymerization reaction, the reactive thinners are incorporated in two-component polyurethane lacquers through the hydroxyl groups preferably which are preferably present in this case. However, the olefinic double bonds of the reactive thinners can participate in the crosslinking reaction through a "double-cure reaction", particularly if, in addition to the isocyanate polyaddition reaction, a polymerization reaction of the olefinically unsaturated double bonds is initiated through the use of peroxides or siccatives (additional drying under the effect of atmospheric oxygen). Reactive thinners used in accordance with the invention containing incorporated long-chain aliphatic monocarboxylic acids are particularly suitable for use in two-component polyurethane coating compositions because they provide the resulting coatings with excellent hydrophobic properties.

Two-component polyurethane coating compositions, which may be modified in accordance with the invention through the use of the reactive thinners, are known and described, for example, in U.S. Pat. Nos. 3,124,605, 3,358,010, 3,903,126, 3,903,127, 3,976,622, 3,183,112, 3,394,111, 3,645,979, 3,919,218 and in GB-PS 1,060,430, 1,234,972, 1,506,373 and 1,458,564.

However, two-component polyurethane lacquers in the context of the present invention also include mixtures of the reactive thinners suitable for use in accordance with the invention with the known lacquer polyisocyanates used in two-component polyurethane lacquers, but without the hydroxy-functional resins which are normally present. In two-component polyurethane coating compositions of this type, the binders are based solely on the reactive thinners and the polyisocyanates.

In all these two-component systems, the polyisocyanate component is preferably selected from the known biuret-, isocyanurate-, uretdione- and/or urethane-modified lacquer polyisocyanates prepared from monomeric diisocyanates, such as hexamethylene diisocyanate, isophorone diisocyanate and also 2,4- and/or 2,6-diisocyanatotoluene. Lacquer polyisocyanates containing aliphatically bound isocyanate groups are preferred.

Epoxy resins which may be used with the reactive thinners in accordance with the invention are the known and include those which react with hydroxyl, carboxyl and, in particular, amino groups. Such epoxy resins are described, for example, in H. Wagner, H. F. Sarz "Lackkunstharze", Carl Hanser Verlag, München, 5th Edition (1971), pages 174 et seq.; "Methoden der organischen Chemie", Houben Weyl, 4th Edition, Georg Thieme Verlag, Stuttgart/ New York (1987), Vol. 3, Makromolekulare Stoffe, pages 1891 et seq.; and—in the case of the coatings produced therefrom—in Ullmanns Enzyklopädie der technischen Chemie, Verlag Chemie Weinheim (1978), 4th Edition, Vol. 15, pages 637 et seq. Octadienyl ethers containing 0.1 to 30% by weight of carboxyl groups and 0 to 20% by weight of hydroxyl groups are particularly suitable for use as reactive thinners for systems containing epoxy resins as their primary binder component. In the curing of these systems, the reactive thinners take part in the crosslinking reaction via these reactive groups. Further crosslinking through the previously described "double cure reaction" is also possible in this case.

Amino resins which may be combined with the reactive thinners in accordance with the invention include, in particular, amino resins capable of condensation reactions with hydroxy-functional and carboxy-functional compounds, such as melamine/formaldehyde, urea/formaldehyde and/or guanamine/formaldehyde condensates, as described in FR-PS 943 411; D. H. Solomon, "The Chemistry of Organic Filmformers", John Wiley & Sons, Inc., New York (1974), pages 235–240; "Methoden der organischen Chemie", Houben-Weyl, 4th Edition, Georg Thieme Verlag, Stuttgart/ New York (1987), Vol. 3, Makromolekulare Stoffe, pages 1811 et seq.; H. Wagner and H. F. Sarx "Lackkunstharze", Carl Hanser Verlag, München, 5th Edition (1971), pages 61 et seq.; and—in the case of the coatings produced therefrom—in Ullmanns Enzyklopädie der technischen Chemie, Verlag Chemie Weinheim (1978), 4th Edition, Vol. 15, pages 643 et seq. The reactive thinners according to the invention which are preferred for this use have a hydroxyl group content of 0 to 35% by weight and a carboxyl group content of 0.1 to 20% by weight. In this case, too, the reactive thinners are incorporated through the known condensation reaction with the amino resins. Additional crosslinking through the previously described double-cure reaction is also possible.

Phenol/formaldehyde resins which may be combined with the reactive thinners of the present invention include, in particular, phenol/formaldehyde resins capable of condensation reactions with hydroxyl and carboxyl groups, such as novolak and/or resol resins, as described in "Methoden der organischen Chemie", Houben-Weyl, 4th Edition, Georg Thieme Verlag, Stuttgart/ New York (1987), Vol. 3, Makromolekulare Stoffe, pages 1794 et seq. and H. Wagner and H. F. Sarx "Lackkunstharze", Carl Hanser Verlag, Manchen, 5th Edition (1971), pages 45 et seq. The hydroxyl and carboxyl group contents for the phenol/formaldehyde resins are the same as previously set forth for the amino resins. A double-cure reaction mechanism is also possible.

Even when they are used in binders or binder compositions which do not contain any radical-curing olefinic double bonds, the octadienyl ethers by virtue of their ability to undergo additional oxidative crosslinking provide for an increase in the solvent resistance of the resulting coatings. Where they are used in amino resins or phenolics, the content of releasable formaldehyde can be reduced because smaller amounts of crosslinking agent are required to produce high-quality stoving lacquers. In cases where the octadienyl ethers to be used in accordance with the invention are combined with blocked polyisocyanates or with compositions containing blocked polyisocyanates, their concentration and, thus, the quantity of blocking agent to be released can also be reduced for the same crosslink density.

In general, the constituents of the coating materials according to the invention are mixed and homogenized at temperatures of 5° to 150° C. and are then optionally subjected to further modifications. Although it is not preferred, the octadienyl ethers according to the invention may be prepared in the presence of other binder components. For example, the octadienyl ethers may be esterified with acids or anhydrides as previously described in the presence of binders which are inert under esterification conditions.

After the reactive thinners have been combined with the other constituents of the binders, the resulting compositions, which are useable without solvents, may be used for the production of coatings, knifing fillers, sealing compositions and coating materials in combination with other modifiers, such as pigments, fillers, siccatives, flow control agents, antiskinning agents, foam inhibitors, curing catalysts, UV absorbers, accelerators, catalysts, thermal, photochemical and oxidative stabilizers, organic solvents and water.

Compositions containing octadienyl ethers as reactive thinners can also be processed from aqueous emulsion, for example, by the use of emulsifiers and, optionally, the known auxiliaries used in the emulsion field. Emulsifiers suitable for this purpose are known and described, for example, in Ullmanns Enzyklopädie der technischen Chemie, Vol. 10, 4th Edition, pages 449 et seq.

Another possibility for the preparation of aqueous emulsions is the ionic modification of the individual binder components, including in particular the reactive thinners, for example, by at least partial neutralization of the carboxyl groups present with a base, such as an alkali metal hydroxide, a tertiary amine or ammonia.

The binder combinations containing the reactive thinner according to the invention may be used for the production of various coating compositions. These coating compositions containing reactive thinners according to the invention may be used, for example, for coating wood, plastics, leather, textiles, glass, ceramic or metals. They may be applied by any of the known methods, such as spray coating, spread coating, flood coating, casting, dip coating and roll coating.

The coating compositions are applied in quantities such that, after curing, the coating has a dry film thickness of 0.005 to 0.1 mm.

The application of knifing fillers and sealing compositions requires layer thicknesses of up to several millimeters and, possibly, even several centimeters.

The coating compositions according to the invention may be cured at temperatures of 0° to 250° C., depending upon the type of curing reaction. Air-drying lacquers and those containing crosslinking agents with free isocyanate groups are generally cured at temperatures of 0° to 130° C., preferably at room temperature.

Stoving lacquers containing, for example, masked (blocked) polyisocyanates or amino resins as crosslinking agents, generally require curing temperatures of 60° to 250° C. It is sometimes of advantage to begin the curing reaction at temperatures below 120° C. and to complete it at temperatures above 120° C. Catalysts, such as the previously described siccatives, may also be used.

In the following examples, all percentages are by weight unless otherwise indicated.

EXAMPLES

The reactive thinners used in the examples are listed in the following Table. Those containing ester groups are prepared from the starting set forth by melt condensation under nitrogen at 160° to 200° C.

| Example No. | Reactive thinners (quantitiies in g) | | | | | | | | |
|---|---|---|---|---|---|---|---|---|---|
| | 1 | 2 | 3 | 4 | 5 | 6 | 7 | 8 | 9 |
| Glycerol octadienyl ether | — | 194.0[1] | — | — | — | 100[1] | — | 450[3] | — |
| Trimethylol propane octadienyl ether | 205.4 | — | 75.3[2] | 85.71[2] | 85.5[2] | — | 100[2] | — | 100[4] |
| Soybean oil fatty acid | 154.5 | 166.7 | — | — | — | — | — | — | — |
| Cyclohexanoic acid | — | — | 28.73 | — | — | — | — | — | — |
| Phthalic anhydride | — | — | — | 18.88 | — | — | — | 148 | — |
| Hexahydrophthalic anhydride | — | — | — | — | 17.7 | — | — | — | — |
| COOH/OH equivalent ratio | 1:1 | 1:1 | 1:1 | 1:1 | 1:1 | — | — | 1:1.5 | — |
| Characteristic data | | | | | | | | | |
| Carboxyl group content (%) approx. | 0.1 | 0.1 | 0.2 | 0.2 | 1.0 | — | — | 0.5 | — |
| Viscosity [mPas/23° C.] | 34 | 27 | 53 | 273 | 282 | 36 | 42 | 683 | — |
| Hydroxyl group content (%) approx. | 0.2 | 0.1 | 0.5 | 1.0 | 0.8 | 5.5 | 5.0 | 3.9 | — |

[1] Hydroxyl group content: 5.5%
[2] Hydroxyl group content: 5.1%
[3] Hydroxyl group content: 11.4%
[4] Hydroxyl group content: 14.2%

APPLICATION EXAMPLE I a) Production of an Alkyd Resin 8,174 g of soybean oil fatty acid, 2,520 g of pentaerythritol and 3,222 g of phthalic anhydride were weighed into a 50 liter tank reactor equipped with a stirrer, distillation bridge and heating and nitrogen inlet pipe, and condensed at 230° C. while nitrogen was passed through until an acid value of 20.3 mg KOH/G was reached.

b) Production Of A Clear Coating From An Alkyd Resin/Reactive Thinner Mixture 100 parts by weight of the alkyd resin were combined with 66.67 parts by weight of the reactive thinner of Example 3. After addition of siccatives based on metal octoates (corresponding to 0.6 parts by weight of lead, 0.15 parts by weight of calcium and 0.04 parts by weight of cobalt), the resin mixture was applied to a glass plate in a layer thickness of 60 μm and was dried at room temperature. After 8 hours, the coating had cured to a tack-free state.

APPLICATION EXAMPLE II

Lacquer Based on a Silicone Resin 50 parts by weight of the reactive thinner of Example 7 were added to 100 parts by weight of a 50% solution of a methyl silicone resin (Baysilone-Harz M 120, a product of Bayer AG) having a viscosity of 56 mPas (23° C.) and the solvent mixture of xylene and butanol was removed by the application of a vacuum at a temperature below 50° C. The resin mixture obtained was applied without solvent. A siccative composition of metal octoates having metal contents of 0.6 parts by weight of lead, 0.15 parts by weight of calcium and 0.04 parts by weight of cobalt was added to the resin mixture. After the resin had been applied in a layer thickness of 20 μm, a tack-free coating was obtained after drying for 8 hours at room temperature. In addition, the silicone resin was stabilized by the presence of the reactive thinner. Butanol served as stabilizer in the original solvent-containing form.

APPLICATION EXAMPLE III

Coating Composition Based on an Epoxy Resin

A thinly liquid, readily processable coating composition which cured after a short time was prepared from 100 parts by weight of a medium-viscosity unmodified epoxy resin based on bisphenol A and epichlorohydrin and having an iodine color value of 3, a viscosity of 11,300 mPa.s (25° C.) and an epoxide equivalent weight of approx. 190, 25 parts by weight of the reactive thinner based on the esterification product of trimethylol propane octadienyl ether and cyclohexanoic acid (Example 3) and 19 parts by weight of an aliphatic polyamine consisting essentially of pentaethylene hexamine and having an iodine color value of 35, a viscosity of 220 mPa.s (20° C.) and an NH equivalent weight of 35. The advantage of the reactive thinner lies in its low viscosity and in its compatibility with the epoxy resin/amine curing system. By virtue of its oxidative drying properties, it cured in the coating itself without any adverse effect on the epoxide/amine curing reaction. There was no need for additional resin or curing agent.

APPLICATION EXAMPLE IV

Coating Composition Based on an Unsaturated Polyester Resin a) Production of an unsaturated polyester resin 928 g of fumaric acid, 298 g of ethylene glycol, 274 g of propane-1,2-diol and 432 g of benzyl alcohol were esterified with stirring under nitrogen at 180° C. in a 3 liter glass flask. An unsaturated polyester resin having an acid value of 29.3 mg KOH/g and a viscosity of 4,895 mPa.s (23° C.) was obtained.

b) Use according to the invention 100 parts by weight of the unsaturated polyester resin IVa), 100 parts by weight of the reactive thinner from Example 8, 2 parts by weight of a cobalt octoate solution in toluene, metal content 2.2%, and 3 parts by weight of methyl ethyl ketone peroxide were mixed at room temperature.

This mixture was applied to a glass plate in a layer thickness of 90 μm and was dried at room temperature. A tack-free coating having a scratch-resistant surface was obtained after 6.5 hours.

APPLICATION EXAMPLE V

Waterborne Composition Containing an Unsaturated Polyester Resin 200 parts by weight of unsaturated polyester resin IV a), 20 parts by weight of the reactive thinner from Example 8 and 10 parts by weight of an emulsifier resin were mixed. The resulting mixture was mixed in portions with 50 parts by weight of deionized water using a high speed stirrer (840 r.p.m.) and homogenized for 2 minutes. A fine-particle, stable aqueous emulsion was obtained. The emulsifier used was the reaction product of 1.0 mole of isophorone diisocyanate, 0.8 moles of trimethylol propane diallyl ether, 0.05 moles of trimethylol propane and 0.46 moles of a 1500 MW polyethylene glycol. The emulsifier produced from these starting materials had an ethylene oxide content of 59.4% and a content of olefinic double bonds (molecular weight 24), based on solids, of 3.5%.

0.3 parts by weight of a 30% $H_2O_2$ solution in water and 0.2 part by weight of a 21.8% aqueous cobalt acetate solution (5.15% cobalt) were added to 10 parts by weight of the emulsion thus prepared and knife-coated onto a glass plate in a layer thickness of 90 μm. A scratch-resistant tack-free coating was obtained after drying for 7 hours at room temperature.

APPLICATION EXAMPLE VI

Coating Based on an Amino Resin 100 parts by weight of a 60% solution of a commercial amino resin (Plastobal EBS 400, a product of BASF AG, Ludwigshafen) in isobutanol were mixed with 120 parts by weight of the reactive thinner from Example 6, after which the isobutanol was removed by the application of a vacuum at elevated temperature (max. 40° C.). A 60% solution of the resin in the reactive thinner having a viscosity of 1,740 mPa.s at 23° C. was obtained. After storage for 8 weeks at room temperature in the absence of atmospheric oxygen, there was no sign of any change in viscosity.

After the addition of 2 parts by weight of p-toluenesulfonic acid and 1 part by weight of a siccative composition of metal octoates having a metal content of 0.6 parts by weight of lead, 0.15 parts by weight of calcium and 0.04 parts by weight of cobalt, the mixture was knife-coated onto a glass plate to form a coating having a layer thickness of 60 μm. After 6 hours, the film surface was tack-free and tough. The absence of alcohols as solvents and stabilizers for the amino/formaldehyde resin and the additional oxidative drying of the reactive thinner/amino resin system, which contributed towards reducing formaldehyde emissions during hardening, were all advantages.

APPLICATION EXAMPLE VII

Lacquer Based On A Phenolic Resin

In Phenodur PR 612, a product of Hoechst AG (80% solution of a phenolic resin in butanol), butanol was removed and replaced by the same quantity of the reactive thinner from Example 4. 50 parts by weight of an epoxy resin (Beckopox EP 307, a product of Hoechst AG, were then added to 100 parts by weight of the above mixture. The resulting mixture was applied to a glass plate in a layer thickness of 30 μm and cured for 30 minutes at 180° C. A hard and elastic coating having a high surface quality was obtained.

APPLICATION EXAMPLE VIII

Two-Component Polyurethane Coating Composition a) Production of a hydroxy-functional polyacrylate resin 4,348 g of xylene and 2 g of tin dioctoate were weighed in to an autoclave equipped with a stirrer, reflux condenser and cooling and heating system while half of the reactor volume of nitrogen per hour was passed through. After the reactor had been closed the contents were heated with stirring to 175° C. A mixture of 3,848 g of ε caprolactone, 4,352 g of hydroxyethyl acrylate, 3,298 g of styrene, 2,854 g of butyl acrylate, 112 g of polybutadiene (Nisso G-1000, a product of Nippon Soda Co. containing 10% cis/trans double bonds and 90% 1,2-vinyl double bonds; $M_n = 1,350$ g/mol), 110 g of acrylic acid and 170 g of n-dodecyl mercaptan introduced from a holding vessel into the autoclave over a period of 4 hours through a metering unit. The temperature was kept constant at 175° C. At the same time, 454 g of di-tert.-butyl peroxide in 452 g of xylene were added from a second holding vessel over a period of 5 hours. After the peroxide has been added, the contents of the autoclave were stirred for 2 hours at 175° C. After the contents of the autoclave had cooled, a resin mixture was obtained having a solids content of 75.4%, a viscosity of 3,975 mPa.s at 23° C., an acid value of 6.6 mg KOH/G, a hydroxyl value of 104 mg KOH/g and a Hazen color value of 35 APHA.

b) Coating from composition containing polyacrylate resin/reactive thinner/polyisocyanate 102 g of the reactive thinner from Example 9 were added to 317 g of the hydroxy-functional polyacrylate resin, after which the solvent (xylene) was removed by the application of a vacuum at 60° C. in an inert gas atmosphere.

A 100% clear colorless resin mixture having an acid value of 5.2 mg KOH/g and a hydroxyl value of 226 mg KOH/g was obtained.

4.39 parts of the trimer of hexamethylene diisocyanate (Desmodur N 3300, a product of Bayer AG) were added to 5.61 parts of this resin mixture so that one NCO group per OH group was available for crosslinking. After addition of 0.02 parts of dibutyl tin oxide, a 30 μm thick coating was knife-coated onto a glass plate and dried at room temperature. A tack-free coating having a tough film surface was obtained after 6 hours.

The advantage of the reactive thinner lies in the production of completely solventless polyurethane coating compositions based on polyacrylate resins which can be cured to coatings resistant to light and chemicals. The reactive thinner is incorporable in the coating through its free hydroxyl groups (OH-NCO reaction). Additional oxidative crosslinking was produced by the octadienyl ether group so that the crosslink density was increased and the stability properties were improved. At the same time, the octadienyl ether group provided the PUR lacquer with hydrophobic properties so that the negative effect of atmospheric moisture on the properties of the resulting coating during drying (bubble formation) was reduced.

APPLICATION EXAMPLE IX

Two-Component Polyurethane Coating Composition a) Production of a hydroxyfunctional polyester resin 1,402 g of hexane-1,6-diol, 1,590 g of trimethylol propane, 2,564 g of cyclohexane dimethanol, 1,857 g of neopentyl glycol, 3,816 g of adipic acid and 2,096 g of maleic anhydride were weighed into a tank reactor equipped with a reflux condenser, stirrer and heating and cooling system while half the reactor volume of nitrogen per hour was passed through. The contents were heated 180° C. and the polycondensation reaction proceeded at that temperature with elimination of the water of reaction to provide a resin having an acid value of 1.9 mg KOH/g, a hydroxyl value of 159 mg KOH/g, a Hazen color value of 35 APHA and a viscosity (at a solids content of 80% in butyl acetate of 2,912 mPa.s) at 23° C.

b) Coating from composition containing polyester resin/reactive thinner/polyisocyanate 115 g of the reactive thinner from Example 9 were added to 270 g of the hydroxy-functional polyester resin, after which butyl acetate was removed by application of vacuum at 60° C. in an inert gas atmosphere.

A solventless, clear, colorless resin mixture having an acid value of 0.4 mg KOH/g, a hydroxyl value of 244 mg KOH/g and a viscosity of 20,300 mPa.s at 23° C. was obtained.

4.39 parts of the trimer of hexamethylene diisocyanate (Desmodur N 3300, a product of Bayer AG) were added to 5.42 parts of the resin mixture in a stoichiometric equivalent ratio of OH groups to NCO groups. After the addition of 0.02 parts of dibutyl tin oxide, a coating was knife-coated onto a glass plate in a layer thickness of 60 μm and dried at room temperature.

A tack-free coating having a tough film surface was obtained after 7.5 hours. The advantages of the mixture according to the invention were the same as those discussed in Application Example VIII.

APPLICATION EXAMPLE X

Coating Composition Containing an Unsaturated Polyacrylate Resin a) Production of an unsaturated polaycrylate resin 219.3 g of adipic acid, 166 g of terephthalic acid, 382.5 g of ethoxylated trimethylol propane (average of 3.9 ethylene oxide units per OH group) and 186.3 g of ethylene glycol were weighed into a reaction vessel equipped with a stirrer, reflux condenser, water separator and heating and cooling system. The polycondensation reaction was conducted at 230° C. while half the reactor volume of nitrogen per hour was passed through until an acid value of 3 mg KOH/g was reached.

451.3 g of toluene, 252.0 g of acrylic acid, 15.8 g of p-toluenesulfonic acid, 2.1 g of p-methoxyphenol, 2.1 g of 2,6-di-tert. butyl methyl phenol and 1.05 g of trichloroethyl phosphite were then added at 40° C. Polycondensation of the reaction mixture was conducted under azeotropic conditions at 20° C. while air was passed through until an acid value of 15.6 mg KOH/g was reached. After removal of toluene by distillation, an unsaturated acrylate resin was obtained having a viscosity of 8800 mPa.s at 23° C.

b) Coating from composition containing the unsaturated polyester acrylate resin and a reactive thinner 66.67 parts of the above-described polyester acrylate and 33.33 parts of the glycerol bis-octadienyl ether from Example 6 were mixed together at 40° C. A resin mixture having a viscosity of 640 mPa.s at 23° C., an acid value of 9.6 mg KOH/g and a hydroxyl value of 89 mg KOH/g was obtained.

2 parts by weight of a toluene solution of cobalt octoate having a metal content of 2.2 parts by weight and 3 parts by weight of methyl ethyl ketone peroxide were added to 100 parts by weight of the resin mixture. The resulting mixture was applied to a glass plate in a layer thickness of 90 μm and dried at room temperature. A scratch-resistant coating having a tough film surface was obtained after 9 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is suitable for the preparation of coatings, sealants and/or fillers and comprises one or more binder components and as reactive thinner an octadienyl ether which may contain ester groups and which has a viscosity at 23° C. of at most 5,000 mPas and a content of 1 to 80% by weight of octadienyl groups,. —$C_8H_{13}$, 0 to 35% weight of hydroxyl groups and 0 to 30% by weight of carboxyl groups.

2. The composition of claim 1 wherein the octadienyl ether comprises a member selected from the group consisting of
    a) octadienyl ethers of polyhydric alcohols having a molecular weight of 62 to 400 and
    b) esterification products obtained by reacting the octadienyl ethers set forth in a) with less than equivalent quantities of
        i) saturated monobasic or polybasic acids having a molecular weight of 60 to 600
        ii) olefinically unsaturated monobasic or polybasic acids having a molecular weight of 60 to 600
        iii) anhydrides of the acids set forth under i) and ii).

3. The composition of claim 1 wherein the octadienyl ethers are used in a quantity of 1 to less than 100% by weight, based on all of the binder components, including the reactive thinners.

4. The composition of claim 2 wherein the octadienyl ethers are used in a quantity of 1 to 100% by weight, based on all of the binder components, including the reactive thinners.

5. The composition of claim 1 wherein said binder component comprises a radical-curable, olefinically unsaturated, polyester resins which may contain urethane groups.

6. The composition of claim 2 wherein said binder component comprises a radical-curable, olefinically unsaturated, polyester resin which may contain urethane groups.

7. The composition of claim 1 wherein said binder component comprises an oxidatively curable alkyd resin.

8. The composition of claim 2 wherein said binder component comprises an oxidatively able alkyd resin.

9. The composition of claim 1 wherein said binder component comprises a two-component polyurethane coating composition.

10. The composition of claim 2 wherein said binder component comprises a two-component polyurethane coating composition.

11. The composition of claim 1 wherein said binder component comprises an epoxy resin.

12. The composition of claim 2 wherein said binder component comprises an epoxy resin.

13. The composition of claim 1 wherein said binder component comprises an amino resin or a phenolic resin.

14. The composition of claim 2 wherein said binder component comprises an amino resin or a phenolic resin.

15. The composition of claim 1 wherein said binder component comprises a silicone resin.

16. The composition of claim 2 wherein said binder component comprises a silicone resin.

* * * * *